(12) United States Patent
Brunel

(10) Patent No.: US 7,023,898 B2
(45) Date of Patent: Apr. 4, 2006

(54) ACCELERATED METHOD OF DETECTION BY SPHERES

(75) Inventor: Loic Brunel, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 895 days.

(21) Appl. No.: 10/012,330

(22) Filed: Dec. 12, 2001

(65) Prior Publication Data

US 2002/0126772 A1    Sep. 12, 2002

(30) Foreign Application Priority Data

Dec. 22, 2000   (FR)   ................................ 00 17255

(51) Int. Cl.
*H04L 27/30*   (2006.01)

(52) U.S. Cl. ...................... 375/140; 375/148; 375/262; 375/341

(58) Field of Classification Search ................ 375/140, 375/141, 147, 148, 262, 340, 341, 348–350; 455/63, 296

See application file for complete search history.

(56) References Cited

U.S. PATENT DOCUMENTS

| | | | |
|---|---|---|---|
| 5,159,610 A * | 10/1992 | Eyuboglu et al. | 375/290 |
| 5,388,124 A * | 2/1995 | Laroia et al. | 375/286 |
| 6,614,861 B1 * | 9/2003 | Terry et al. | 375/347 |

OTHER PUBLICATIONS

[2000 IEE 0-7803-5857-0/00] O. Damen et al., Sphere Decoding of Space-Time Codes, Jun. 25-30, 2000, ISIT 2000.*

[1999 IEEE0-7803-5268-8/99] Brunel et al., Euclidean Space Lattice Decoding For Joint Detection In CDMA Systems, 1999 IEEE ITW, Kruger National Park, South Africa, Jun. 20-25, 1999, p. 129.*

L. Brunel, et al., Proceedings of the 1999 IEEE Information Theory and Communications Workshop, p. 129, XP-002178306, "Euclidean Space Lattice Decoding for Joint Detection in CDMA Systems", Jun. 20, 1999.

E. Viterbo, et al., IEEE Transactions on Information Theory, vol. 45, No. 5, pp. 1639-1642, XP-002178307, "A Universal Lattice Code Decoder for Fading Channels", Jul. 1999.

G. D. Forney, IEEE Transactions on Information Theory, vol. 35, No. 4, pp. 906-909, XP 000100922, "A Bounded-Distance Decoding Algorithm for the Leech Lattice, with Generalizations", Jul. 1, 1989.

* cited by examiner

*Primary Examiner*—Dac V. Ha
(74) *Attorney, Agent, or Firm*—Oblon, Spivak, McClelland, Maier & Neustadt, P.C.

(57) ABSTRACT

A method of detecting a plurality of symbols ($d_k(i)$) transmitted by or for a plurality K of users, each symbol belonging to a modulation constellation and being the subject of a spectral spreading by means of a spreading sequence, the method including a filtering step adapted for supplying a real vector (z) characteristic of the received signal, at least the closest neighbor of the vector being sought within a lattice of points ($\Xi$) generated by the modulation constellations, the search being limited to candidate vectors (x), each of whose components ($b_i$) has a value lying within a search interval defined by a lower bound ($B_i^-$) and an upper bound ($B_i^+$), the bounds being chosen so that each of the intervals comprises only component values of points situated within a sphere with a predetermined radius ($\sqrt{C}$) and belonging to a modulation constellation.

7 Claims, 4 Drawing Sheets

ACCELERATED METHOD OF DETECTION BY SPHERES

CROSS-REFERENCE TO RELATED APPLICATIONS

This application claims priority under 35 U.S.C. § 119 and the international convention to French application No. 00 17255, filed Dec. 22, 2000.

BACKGROUND OF THE INVENTION

1 Field of the Invention

The present invention concerns a multiuser detection method and device. More particularly, the present invention concerns a maximum likelihood multiuser detection method and device for a DS-CDMA (Direct Sequence Code Division Multiple Access) telecommunication system.

2 Description of Related Art

In a DS-CDMA mobile telecommunication system, the separation of the communications coming from or going to the different users is achieved by multiplying each complex symbol of a user by a spreading sequence which is peculiar to him, also referred to for this reason as the user signature. The spreading frequency (chip rate) being greater than the frequency of the symbols, the signal transmitted by each user is distributed (or spread) in the space of the frequencies. The ratio between the band occupied by the spread signal and the band occupied by the information signal is referred to as the spreading factor. On reception, the separation of a given user is obtained by means of a filtering adapted to the corresponding signature. When the transmission channel has a plurality of propagation paths, the output of the adapted filtering contains as many correlation peaks. Each path of the channel can be modelled by a complex multiplicative coefficient and a delay. The signals being propagated along the different paths can be aligned and combined by means of complex coefficients which are conjugates of the path coefficients, thus effecting a filtering adapted to the transmission channel. In order to simplify the terminology, the general expression "filtering adapted to the user k" will encompass both the filtering operation adapted to the signature of the user k and the filtering operation adapted to the transmission channel.

To combat the interference between signals destined for (the downlink) or coming from (the uplink) the different users, multiuser detection methods have been proposed, and notably iterative detection methods such as those known as PIC (Parallel Interference Cancellation) and SIC (Serial Interference Cancellation). They are based on the iteration of an interference elimination cycle including the estimation of the symbols transmitted, the evaluation of the interferences and their subtraction from the signals received. Although of high performance, these methods are not optimal since they do not provide an estimation in the sense of the maximum likelihood of the symbols transmitted by the different users.

A method of multiuser detection with maximum likelihood inspired by the Viterbi algorithm was proposed by S. Verdu in an article entitled "Minimum probability of error for asynchronous Gaussian multiple access channels", published in IEEE Transactions on Information Theory, pages 85–96, January 1986, but its complexity is prohibitive since it varies exponentially with the number of users.

More recently a method of multiuser detection with maximum likelihood using a representation by a lattice of points was proposed by L. Brunel et al, in an article entitled "Euclidian space lattice decoding for joint detection in CDMA system" published in Proceedings of ITW, page 129, June 1999. According to this method, a vector characteristic of the received signal representing a statistic sufficient for the maximum likelihood detection of the symbols transmitted by the different users is determined. It is shown under certain conditions that the characteristic vector can be represented as the point in a lattice disturbed by a noise. The detection then consists of seeking the point in the lattice closest to the point corresponding to the vector received. However, the dimension of the lattice to be used generally being 2·K where K is the number of users, the number of points to be tested is still very high.

BRIEF SUMMARY OF THE INVENTION

To simplify detection, it has been proposed to limit the search for the closest neighbour to the points in the lattice belonging to a sphere centered around the point received. This simplified detection method, referred to as the "method of detection by spheres", will be disclosed below:

The context is a multiple access mobile telecommunication system with direct sequence spectrum spreading (DS-CDMA) comprising K users communicating synchronously with a base station.

Let $d_k(i)$ be the complex symbol sent by the user k at instant i. This symbol belongs to the modulation constellation $A_k$ used by the user k, which will also be referred to as the alphabet of symbols of the user k. Each user k transmits a block of N symbols with an amplitude of the signal $a_k$. The symbols are spread by a complex signature $s_k(t)=s_k^R(t)+j\cdot s_k^I(t)$ with a duration equal to the symbol period T:

$$s_k(t)=0 \text{ if } t \notin [0, T]$$

The K complex symbols $d_k(i)=d_k^R(i)+j\cdot d_k^I(i)$ transmitted at instant i are placed in a row vector of real values $d_2(i)$ defined as:

$$d_2(i)=(d_1^R(i), d_1^I(i), \ldots, d_K^R(i), d_K^I(i)) \quad (1)$$

The corresponding modulated signal is then, as a function of the time t:

$$S_t = \sum_{i=0}^{N-1} \sum_{k=1}^{K} a_k d_k(i) s_k(t-iT) \quad (2)$$

It is assumed that the channel is an ideal channel with white additive Gaussian noise.

Let $r_t=S_t+\eta_t$ be the signal received at time t and $\eta_t$ a complex Gaussian noise of zero mean whose components have a variance $N_0$.

Let the row vector be $y_2(i)=(y_1^R(i), y_1^I(i), \ldots, y_K^R(i), y_K^I(i))$ such that $y_k(i)=y_k^R(i)+j\cdot y_k^I(i)$ is the complex output at instant i of the filter adapted to the user k:

$$y_k(i) \triangleq \int_{-\infty}^{+\infty} s_k^*(t-iT)r_t \, dt \quad (3)$$

$$= \sum_{l=1}^{K} a_l d_l(i) \int_0^T s_l(t) s_k^*(t) \, dt + n_k(i)$$

-continued $$= \sum_{l=1}^{K} a_l d_l(i) R_{lk} + n_k(i)$$

with $$R_{lk} = \int_0^T s_l(t) s_k^*(t) dt = R_{lk}^R + j \cdot R_{lk}^I \quad f$$

for $k, l = 1, \ldots, K$ and $n_k(i) = \int_0^T \eta_t \cdot s_k^*(t - i \cdot T) dt$ The autocorrelation matrix of the spreading sequences will be denoted R(i).

If the complex elements of (3) are decomposed into their real and imaginary parts, there is obtained:

$$[y_k^R(i) + j \cdot y_k^I(i)] = \sum_{l=1}^{K} a_l [b_l^R(i) R_{lk}^R - b_l^I(i) R_{lk}^I] + \qquad (4)$$

$$j \cdot \sum_{l=1}^{K} a_l [b_l^R(i) R_{lk}^I + b_l^I(i) R_{lk}^R] + [n_k^R(i) + j \cdot n_k^I(i)]$$

Let $A_2 = \text{Diag}(a_1, a_1, \ldots, a_K, a_K)$ and $R_2$ be the matrix of size $2K \times 2K$ such that:

$$R_2 = \begin{bmatrix} R_{11}^R & R_{11}^I & \cdots & R_{1K}^R & R_{1K}^I \\ -R_{11}^I & R_{11}^R & \cdots & -R_{1K}^I & R_{1K}^R \\ \vdots & \vdots & & \vdots & \vdots \\ R_{K1}^R & R_{K1}^I & \cdots & R_{KK}^R & R_{KK}^I \\ -R_{K1}^I & R_{K1}^R & \cdots & -R_{KK}^I & R_{KK}^R \end{bmatrix} \qquad (5)$$

Equation (4) can then be put in matrix form:

$$y_2(i) = d_2(i) M_2 + n_2(i) \qquad (6)$$

where $M_2$ is a real matrix of size $2K \times 2K$ defined by $M_2 = A_2 R_2$ and where the noise vector $n_2(i) = (n_1^R(i), n_1^I(i), \ldots, n_K^R(i), n_K^I(i))$ has $N_0 R_2$ as its covariance matrix.

It will be demonstrated below that $y_2(i)$, as given by equation (6), can be represented as a point in a lattice $\Lambda_2$ of dimension $2 \cdot K$, with a generator matrix $M_2$ corrupted by a noise $n_2$.

The term real lattice of points $\Lambda$ of dimension $\kappa$ will be used for any set of vectors of $R^\kappa$ satisfying:

$$x = b_1 v_1 + b_2 v_2 + \ldots + b_\kappa v_\kappa \text{ where } b_i \in Z, \forall i = 1, \ldots, \kappa$$

and where $\{v_1, v_2, \ldots, v_\kappa\}$ is a base on $R^\kappa$.

An example of a lattice of points of dimension 2 has been shown in FIG. 1.

The points in the lattice form an additive abelian sub-group of $R^\kappa$, and it is also the smallest sub-group of $R^\kappa$ containing the vectors $\{v_1, v_2, \ldots, v_\kappa\}$ and a Z-modulus of $R^\kappa$. These base vectors form the rows of the generator matrix G for the lattice. It is therefore possible to write $x = bG$ where $$b = (b_1, \ldots, b_\kappa) \in Z^\kappa. \qquad (7)$$

The region delimited by the base vectors is referred to as the fundamental parallelotope and its volume, denoted vol ($\Lambda$) and det($\Lambda$), is referred to as the fundamental volume. This fundamental volume is none other than the modulus of the vectorial product of the $\kappa$ base vectors and is therefore equal to |det(G)| where det designates the determinant. Though there are several possible choices for the generator matrix for the same lattice, on the other hand there is only one value for the fundamental volume.

The Voronoi region V or Dirichlet cell of a point x belonging to the lattice is all the points of $R^\kappa$ closer to x than any other point in the lattice. The volume of this region is equal to the fundamental volume.

The stacking radius $\rho$ of the lattice is the radius of the largest sphere inscribed in the Voronoi region and the radius of coverage that of the smallest sphere circumscribed in this same region. The stacking radius is therefore the radius of the spheres whose stacking constitutes the lattice of points and the radius of coverage is that of the smallest spheres which, centred on the points in the lattice, make it possible to cover the entire space $R^\kappa$. The density of the lattice is the ratio between the volume of the sphere of radius $\rho$ and the fundamental volume. Finally, the coefficient of error (the kissing number) $\tau(\Lambda)$ of the lattice is the number of spheres tangent to one and the same sphere in the stack or, in other words, the number of neighbours of a point in the lattice, situated at the minimum distance $d_{Emin} = 2\rho$.

Consider once again equation (6). The components of the vector $d_2(i)$ belong to a finite alphabet A of cardinal:

$$\text{Card}(\mathbf{A}) = \prod_{k=1}^{K} \text{Card}(\mathbf{A}_k) \qquad (8)$$

The term A will be used for the constellation of the system (or simply constellation) as opposed to $A_k$ said to be modulation constellations.

Assume for example that the components $d_k^R(i)$ and $d_k^I(i)$ are PAM modulation symbols of order M:

$$d_k^R(i) \in \{-M+1, -M+3, \ldots, M-3, M-1\} \text{ and} \qquad (9)$$

$$d_k^I(i) \in \{-M+1, -M+3, \ldots, M-3, M-1\} \qquad (10)$$

If the transformation is effected:

$$d_k'^R(i) = \frac{1}{2}(d_k^R(i) + M - 1) \text{ and } d_k'^I(i) = \frac{1}{2}(d_k^I(i) + M - 1)$$

or again vectorially:

$$\mathbf{d}_2'(i) = \frac{1}{2}(\mathbf{d}_2(i) + v_M) \qquad (11)$$

where $v_M = (M-1, M-1, \ldots, M-1)$ the components $d_k'^R(i)$ and $d_k'^I(i)$ are elements of Z and consequently $d_2'(i)$ is a vector of $Z^{2K}$.

In general terms, if there exists an affine transformation transforming the components $d_k^R(i)$ and $d_k^I(i)$ into elements of Z, the vector $d_2'(i)$ can be represented by a vector of $Z^{2K}$.

In a similar manner, the corresponding transformation is effected on $y_2(i)$, that is to say:

$$y'_2(i) = \frac{1}{2}(y_2(i) + v_M M_2) \quad (12)$$

By means of this transformation, which is assumed to be implicit hereinafter, the vector $d_2(i)M_2$ then belongs to a lattice of points $\Lambda_2$ of dimension $2 \cdot K$ as defined by equation (7) with $G=M_2$. The vector $y_2(i)$ can then be considered to be a point in the lattice $\Lambda_2$ corrupted by a noise $n_2(i)$.

If it is assumed that the components of the noise vector $n_2(i)$ are centred independent random Gaussian variables, the problem of detection in the sense of the maximum likelihood of the symbols transmitted by the different users amounts to a search for the point $z_2$ in the lattice $\Lambda_2$ such that its distance to $y_2(i)$ is at a minimum.

In reality, the components of the noise vector $n_2(i)$ are correlated and the covariance matrix of $n_2(i)$ is $N_0 R_2$.

In order to boil down to the decorrelated case it is necessary, prior to the decoding, to effect an operation of whitening of the noise.

The matrix R being hermitian, the autocorrelation matrix $R_2$ is symmetrical defined positive and can therefore be the subject of a Cholesky factorisation:

$$R_2 = W_2 W_2^T \quad (13)$$

where $W_2$ is an inferior triangular matrix of size $2K \times 2K$.

A whitened observation vector is defined:

$$\tilde{y}_2(i) = y_2(i) W_2^{T^{-1}} \quad (14)$$

and a new lattice of points $\Omega_2$ consisting of vectors of components $(\tilde{x}_1^R(i), \tilde{x}_1^I(i), \ldots, \tilde{x}_K^R(i), \tilde{x}_K^I(i))$ with $\tilde{x}^2(i) = x_2(i) W_2^{T^{-1}}$ where $x_2(i)$ is a vector of components $(x_1^R(i), x_1^I(i), \ldots, x_K^R(i), x_K^I(i))$ belonging to $\Lambda_2$. The lattice $\Omega_2$ has an inferior triangular real matrix as its generator matrix $A_2 W_2$.

It can easily be shown that, after whitening, the covariance matrix of the filtered noise $n_2(i) W_2^{T^{-1}}$ is equal to $N_0 I_{2K}$ where $I_{2K}$ is the identity matrix of dimension $2K$. The detection therefore comprises a first step of whitening the observation vector followed by a step of seeking the closest neighbour within the lattice of points $\Omega_2$.

In order to reduce the number of points to be tested, as illustrated in FIG. 1, it is possible to limit the search to a sphere centred around the point $\tilde{y}_2$. In practice, the choice of the radius of the sphere results from a compromise: it must not be too large in order not to lead to an excessively high number of points and sufficiently large to include at least the closest neighbour.

FIG. 2 depicts schematically a multiuser detection device using a method of detection by spheres. The received signal $r_t$ is filtered by a battery of filters adapted to each of the users, $210_1, \ldots, 210_K$. The real and imaginary components of the observation vector $y_2(i)$ output from the adapted filters are transmitted to a matrix calculation unit performing the spectral whitening operation according to equation (14). The real and imaginary components of the whitened vector $\tilde{y}_2(i)$ are then transmitted to a unit for detection by spheres seeking the closest neighbour of the point received within the lattice $\Omega_2$ of dimension $2 \cdot K$. The coordinates of the closest neighbour directly give the real and imaginary components of the estimated symbols $\hat{d}_k(i)$ for the different users.

The step of searching for the closest neighbour is greedy in calculation time, which may prove very disadvantageous when the number of users is high.

The aim of the present invention is to propose a simplification of the method of detection by spheres.

To this end, the invention is defined by a method of detecting a plurality of symbols ($d_k(i)$) transmitted by or for a plurality K of users, each symbol belonging to a modulation constellation and being the subject of a spectral spreading by means of a spreading sequence, the said method comprising a filtering step adapted for supplying a real vector (z) characteristic of the said received signal, at least the closest neighbour to the said vector being sought within a lattice of points ($\Xi$) generated by the said modulation constellations, the said search being limited to candidate vectors (x), each of whose components ($b_i$) has a value lying within a search interval defined by a lower bound ($B_i^-$) and an upper bound ($B_i^+$), the said bounds being chosen so that each of the said intervals comprises only values of components of points situated within a sphere of predetermined radius ($\sqrt{C}$) and belonging to a modulation constellation.

Advantageously, for a component with a given index i, each pair of lower ($B_i^-$) and upper ($B_i^+$) bounds is calculated from a quantity $T_i$ characteristic of the width of the search interval for the said component. This characteristic quantity is determined by recurrence on the index i: the characteristic quantity ($T_i$) for a given index is determined from the quantity with the previous index ($T_{i+1}$) and the value of a component ($b_{i+1}$) chosen in the search interval ([$B_{i+1}^-$, $B_{i+1}^+$]) relating to the component with the previous index.

For a candidate vector component with a given index (2k), the lower bound of the search interval will be advantageously chosen so as to be greater than the smallest integer ($M_{2k}^-$) corresponding to a symbol of the modulation constellation ($A_k$) and the upper bound of the search interval will be chosen so as to be less than the greatest integer ($M_{2k}^+$) corresponding to a symbol of the modulation constellation.

For a first vector candidate component with a given index (2k-1), the lower bound of the search interval will be chosen so as to be greater than a first integer ($M_{2k-1}^-$) and the upper bound of the search interval will be chosen so as to be less than a second integer ($M_{2k-1}^+$), the said first and second integers being determined from the value of a second component ($b_{2k}$) of the vector candidate such that the first and second components relate to one and the same user.

Advantageously, the said first and second integers are respectively determined as the smallest value and the largest value of the first component such that the complex number defined by the value of the said first component and the value of the said second component is a symbol of the modulation constellation of the said user.

The search for the closest neighbour is preferably carried out by scanning at the said search intervals one by one for the different component indices (i) and by choosing a component value ($b_i$) in each of the said intervals, the bounds of each interval being determined according to the width of the interval with the previous index (i+1) and the component value ($b_{i+1}$) chosen in this same interval.

According to one embodiment, if, during the said search, the norm ($\|w\|$) of a candidate vector is less than the radius of the said sphere, the radius is updated to the value of the said norm.

BRIEF DESCRIPTIONS OF THE SEVERAL VIEWS OF THE DRAWINGS

The characteristics of the invention mentioned above, as well as others, will emerge more clearly from a reading of the following description given in relation to the accompanying figures, amongst which:

DETAILED DESCRIPTION OF THE INVENTION

Figure 1:
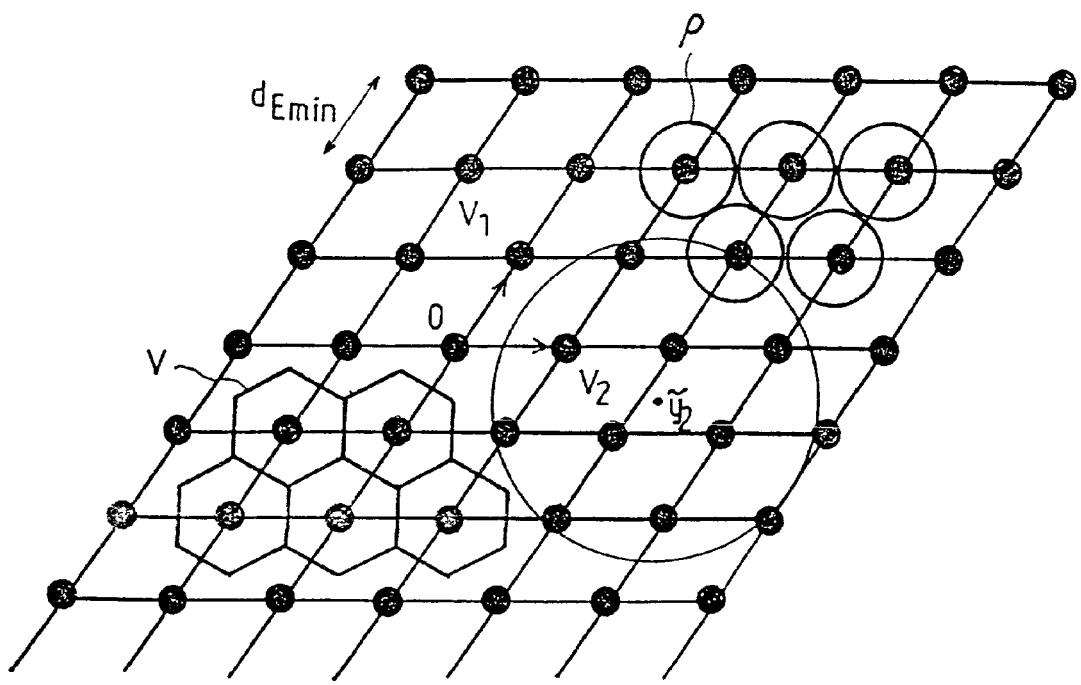
FIG. 1 depicts a lattice of points useful to the detection method employed in the receiver illustrated in FIG. 2.
Figure 2:
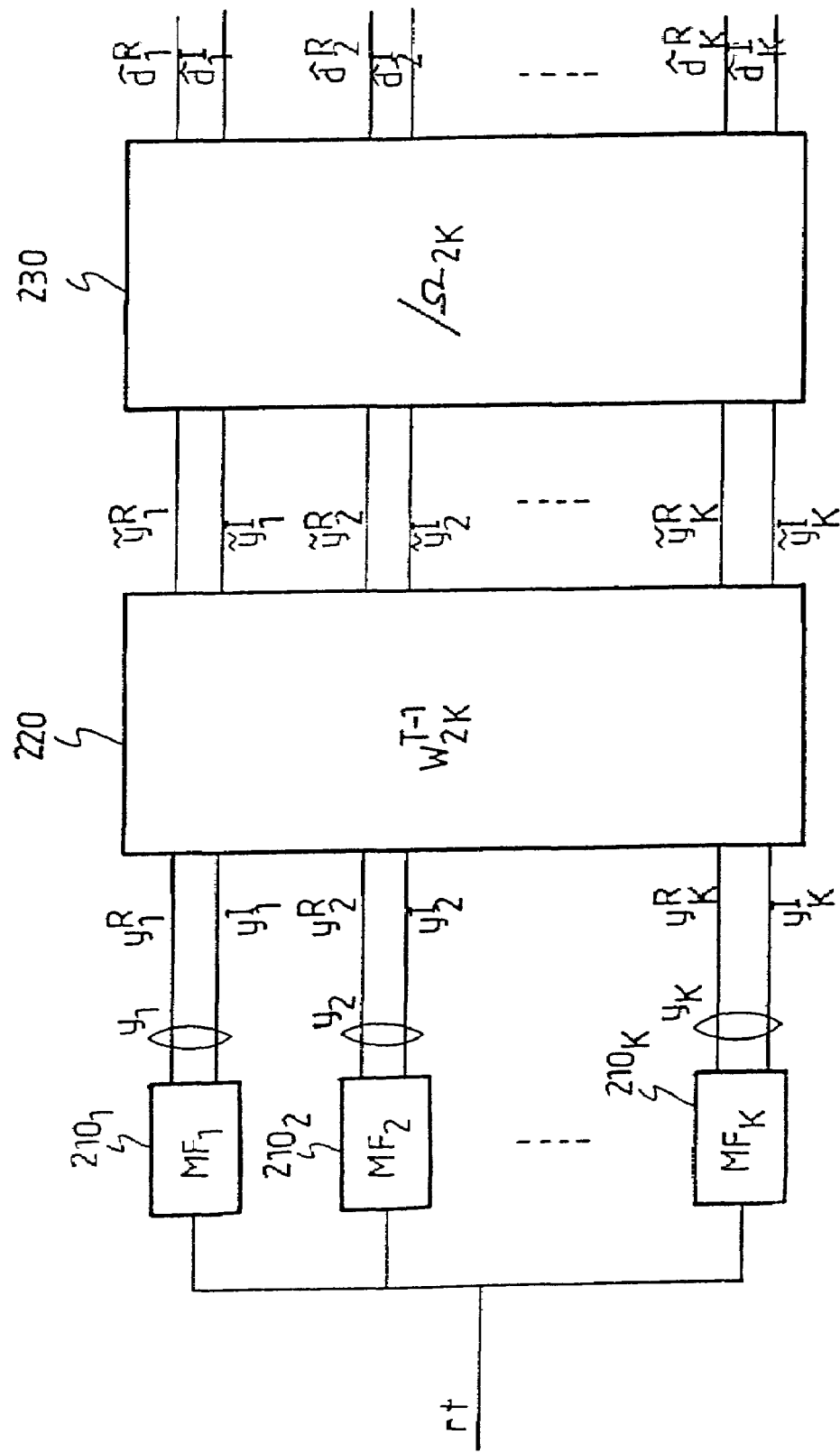
FIG. 2 depicts schematically the structure of a multiuser DS-CDMA receiver using a method of detection by spheres.

Consider once again a DS-CDMA telecommunication system with K users functioning in synchronous mode. As seen above, the detection of the symbols transmitted by the different users in the sense of the maximum likelihood can be reduced to a search amongst the points in a lattice ($\Omega_2$) for the closest neighbour of the point corresponding to the received signal.

In the case where the spreading sequences are real or more generally real multiples of the same complex number, it can be shown that the search can be carried out in a lattice with a dimension reduced to K. This is because, the imaginary terms of the matrix $R_2$ and consequently of the matrix $M_2$ being zero, it is possible to boil down to a lattice of real points $\Lambda$ of dimension K and of generator matrix M:

$$y^R(i) = d^R(i)M(i) + n^R(i) \quad (15)$$

$$y^I(i) = d^I(i)M(i) + n^I(i) \quad (16)$$

where $y^R(i)$, $d^R(i)$, $n^R(i)$ (or respectively $y^I(i)$, $d^I(i)$, $n^I(i)$) are the vectors consisting of the real parts (or respectively of the imaginary parts) of the components of y(i), d(i), n(i); M(i)=AR(i) where R(i) is the matrix consisting of the coefficients $$R_{lk} = \int_0^T s_l(t)s_k(t)dt$$

and A is the vector of the amplitudes of the K users. The observation vectors $y^R(i)$ and $y^I(i)$ belong to $R^K$. After any transformation according to an equation of the same type as (12), the vectors $y^R(i)$ and $y^I(i)$ can be considered to be points in a lattice $\Lambda$ of generator matrix M(i) corrupted by noise.

It can easily be shown that the noise vectors $n^R(i)$ and $n^I(i)$ both have the covariance matrix $N_0 \cdot R(i)$. R being a symmetrical matrix defined positive, it can be factorised according to a Cholesky decomposition: $R = WW^T$ where W is an inferior triangular real matrix of size K×K. In order to decorrelate the noise components, the real observation vectors $y^R(i)$ and $y^I(i)$ are first of all subjected to a whitening operation:

$$\tilde{y}^R(i) = y^R(i)W^{T^{-1}} \quad (17)$$

$$\tilde{y}^I(i) = y^I(i)W^{T^{-1}} \quad (18)$$

Secondly, the closest neighbours of the vectors $\tilde{y}^R(i)$ and $\tilde{y}^I(i)$ belonging to the lattice of points $\Omega$ formed by the vectors $\tilde{x}(i) = x(i)W^{T^{-1}}$, where x(i) belongs to $\Lambda$, are sought. It should be noted that the generator matrix of the lattice $\Omega$ is equal to AW, an inferior triangular real matrix. In addition, it can easily be shown that, after whitening, the covariance matrices of the filtered noises $n^R(i)W^{T^{-1}}$ and $n^I(i)W^{T^{-1}}$ are both equal to $N_0 I_K$ where $I_K$ is the identity matrix of dimension K.

When the symbols of or for the users are transmitted asynchronously, the modelling of the system is more complex since it is necessary to take account of the fact that a symbol of a user can interfere with two or even several consecutive symbols of another user. It can be shown in this case that it is possible to boil down to a search for the closest neighbour within a lattice of dimension 2·K' (K' in the case of real signatures) with K'>K where K' is a function of the number of symbols not yet estimated which may interfere with each other. The detection is however not optimum in the sense of the maximum likelihood.

In all cases, the problem is to determine the point x in a lattice $\Xi$ of dimension κ closest to the received whitened vector $\tilde{y}$, which amounts to minimising the metric $$m(\tilde{y}/x) = \sum_{i=1}^{\kappa} |\tilde{y}_i - x_i|^2 = \|\tilde{y} - x\|^2 \quad (19)$$

where $\tilde{y} = x + \eta$, $\eta = (\eta_1, \ldots, \eta_{78})$ is the noise vector and $x = (x_1, \ldots, x_\kappa)$ is a point belonging to the lattice. The noise vector $\eta$ has independent real components in a Gaussian distribution of zero mean.

It should be noted that the vector y(i) does not need to be whitened if use is made of a metric based on the covariance matrix:

$$m(y/x) = (y-x)R^{-1}(y-x)^T \quad (20)$$

Hereinafter, for reasons of simplification, the observation vector, whitened ($\tilde{y}(i)$) or not (y(i)) will be termed z and the metric acting in equation (19) or (20) will be termed $\|.\|$.

The points in the lattice $\Xi$ can be described by the vectors x=bG where b=($b_1, \ldots, b_\kappa$) has components $b_i$ belonging to the ring of the integers Z and where G is the generator matrix of the lattice. The rows of the matrix G are denoted $\{v_1, v_2, \ldots, v_\kappa\}$. By definition these vectors form a base of the lattice.

The set of transmitted symbols is limited to an alphabet of finite size $A_\kappa \subset Z^\kappa$ referred to as a constellation. This constellation is determined by the modulation constellations used by (or for) the κ users and the cardinal of the alphabet $A_\kappa$ is the product of the cardinals of the different modulation alphabets. It is assumed that the complex points of each of these constellations have real values and evenly distributed imaginary values.

As has been seen, an exhaustive decoding would require a search for the closest neighbour throughout $A_\kappa$. The decoder advantageously restricts its calculation to the points which are situated within an area of the constellation situated around the received point, preferably inside a sphere of given radius $\sqrt{C}$ centred on the received point as depicted in FIG. 1. Only the points in the lattice situated at a quadratic distance less than C from the received point are therefore considered for the minimisation of the metric (19).

In practice, the decoder effects the following minimisation:

$$\min_{x \in \Xi} \|z - x\| = \min_{w \in z - \Xi} \|w\| \quad (21)$$

To do this, the decoder seeks the smallest vector w in the translated set z–$\Xi$. The vectors z and w can be expressed as:

$z = \varrho G$ with $\varrho = (\rho_1, \ldots, \rho_\kappa)$ $w = \xi G$ with $\xi = (\xi_1, \ldots, \xi_\kappa)$ (22)

It is important to note that $\rho$ and $\xi$ are real vectors. As $w = z - x$, where x belongs to the lattice $\Xi$, this gives the equation $$\xi_i = \rho_i - b_i \text{ for } i = 1, \ldots, \kappa \text{ with } w = \sum_{i=1}^{\kappa} \xi_i v_i.$$

The vector w is a point in the lattice whose coordinates $\xi_i$ are expressed in the translated reference frame centred on the received point. The vector w belongs to a sphere of quadratic radius C centred at 0 if:

$$\|w\|^2 = Q(\xi) = \xi G G^T \xi^T \leq C \quad (23)$$

In the new system of coordinates defined by $\xi$, the sphere of quadratic radius C centred at y is therefore transformed into an ellipsoid centred on the origin. The Cholesky factorisation of the Gram matrix $\Gamma = G G^T$ gives $\Gamma = \Delta \Delta^T$, where $\Delta$ is an inferior triangular matrix of elements $\delta_{ij}$.

It should be noted that, if the vector y has been whitened, it is not necessary to effect this factorisation since the generator matrix for the lattice is already triangular and inferior.

However, where prior whitening has not been carried out, and therefore where Cholesky decomposition is necessary:

$$Q(\xi) = \xi \Delta \Delta^T \xi^T = \|\Delta^T \xi^T\|^2 = \sum_{i=1}^{\kappa} \left( \delta_{12} \xi_i + \sum_{j=i+1}^{\kappa} \delta_{ji} \xi_j \right)^2 \leq C \quad (24)$$

By putting $$q_{ii} = \delta_{ii}^2 \text{ for } i = 1, \ldots, \varkappa \quad (25)$$

$$q_{ij} = \frac{\delta_{ij}}{\delta_{jj}} \text{ for } j = 1, \ldots, \varkappa; i = j+1, \ldots, \varkappa$$

there is obtained $$Q(\xi) = \sum_{i=1}^{\kappa} q_{ii} \left( \xi_i + \sum_{j=i+1}^{\kappa} q_{ji} \xi_j \right)^2 \quad (26)$$

Being concerned first of all with the range of possible variations of $\xi_\kappa$, and then by adding the components one by one, the following $\kappa$ inequalities are obtained, which define all the points within the ellipsoid:

$$q_{\kappa\kappa} \xi_\kappa^2 \leq C \quad (27)$$

$$q_{k-1,k-1}(\xi_{k-1} + q_{k,k-1}\xi_k)^2 + q_{\kappa\kappa}\xi_\kappa^2 \leq C$$

$$\forall l \in \{1; \kappa\}, \sum_{i=l}^{\kappa} q_{ii} \left( \xi_i + \sum_{j=i+1}^{\kappa} q_{ji} \xi_j \right)^2 \leq C$$

It can be shown that the inequalities (27) make it necessary for the integer components of b to satisfy:

$$\left\lceil -\sqrt{\frac{C}{q_{\kappa\kappa}}} + \rho_\kappa \right\rceil \leq b_\kappa \leq \left\lfloor \sqrt{\frac{C}{q_{\kappa\kappa}}} + \rho_\kappa \right\rfloor \quad (28)$$

$$\left\lceil -\sqrt{\frac{C - q_{\kappa\kappa}\xi_k^2}{q_{k-1,k-1}}} + \rho_{k-1} + q_{k,k-1}\xi_k \right\rceil \leq$$

$$b_{k-1} \leq \left\lfloor -\sqrt{\frac{C - q_{\kappa\kappa}\xi_k^2}{q_{k-1,k-1}}} + \rho_{k-1} + q_{k,k-1}\xi_k \right\rfloor$$

$$\left\lceil -\sqrt{\frac{1}{q_{ii}}\left(C - \sum_{l=i+1}^{\kappa} q_{ll}\left(\xi_l + \sum_{j=l+1}^{\kappa} q_{jl}\xi_j\right)^2\right)} + \rho_i + \sum_{j=i+1}^{\kappa} q_{ji}\xi_j \right\rceil \leq b_i$$

$$b_i \leq \left\lfloor \sqrt{\frac{1}{q_{ii}}\left(C - \sum_{l=i+1}^{\kappa} q_{ll}\left(\xi_l + \sum_{j=l+1}^{\kappa} q_{jl}\xi_j\right)^2\right)} + \rho_i + \sum_{j=i+1}^{\kappa} q_{ji}\xi_j \right\rfloor$$

where $\lceil x \rceil$ is the smallest integer greater than the real number x and $\lfloor x \rfloor$ is the largest integer smaller than the real number x.

The decoder has $\kappa$ internal counters, namely one counter per dimension, each counter counting between a lower and upper bound as indicated in (28), given that each counter is associated with a particular pair of bounds. In practice these bounds can be updated recursively. We put:

$$S_i = S_i(\xi_{i+1}, \ldots, \xi_\kappa) = \rho_i + \sum_{j=i+1}^{\kappa} q_{ji} \xi_j \quad (29)$$

$$T_{i-1} = T_{i-1}(\xi_i, \ldots, \xi_\kappa) = \quad (30)$$

$$C - \sum_{l=i}^{\kappa} q_{ll}\left(\xi_l + \sum_{j=l+1}^{\kappa} q_{jl}\xi_j\right)^2 = T_i - q_{ii}(\xi_i + S_i - \rho_i)^2$$

$T_{i-1} = T_i - q_{ii}(S_i - b_i)^2$ (31)

with $T_\kappa = C$

Using equations (29) to (31), the range of variation of each component $b_i$ is determined recursively, commencing with the component $b_\kappa$:

$$L_i^- \leq b_i \leq L_i^+ \quad (32)$$

$$\text{with } L_i^- = \left\lceil -\sqrt{\frac{T_i}{q_{ii}}} + S_i \right\rceil \text{ and } L_i^+ = \left\lfloor \sqrt{\frac{T_i}{q_{ii}}} + S_i \right\rfloor \quad (33)$$

Figure 3:
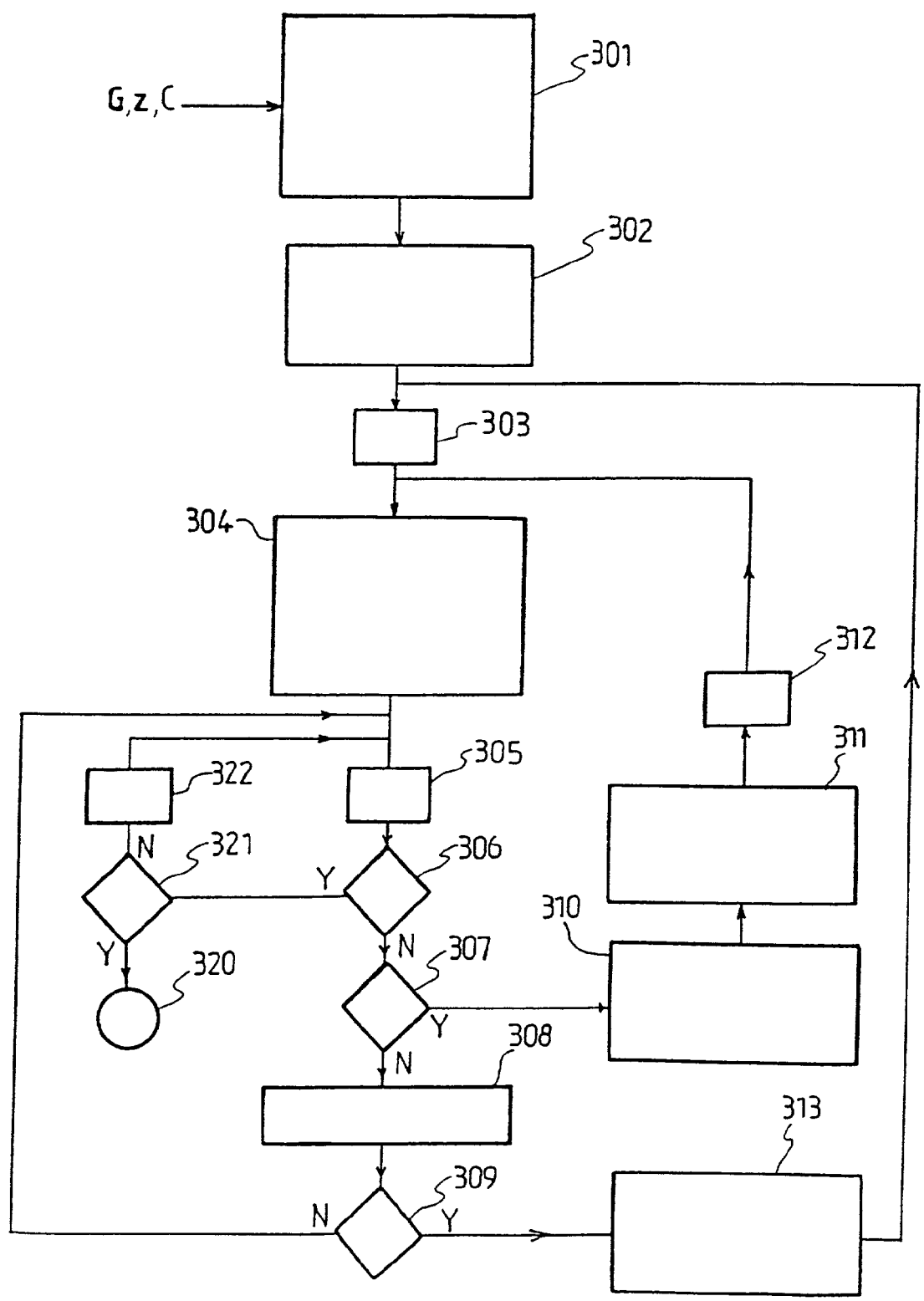
FIG. 3 depicts a flow diagram for the search for the closest neighbour used in the method of detection by spheres according to the invention.
Figure 4:
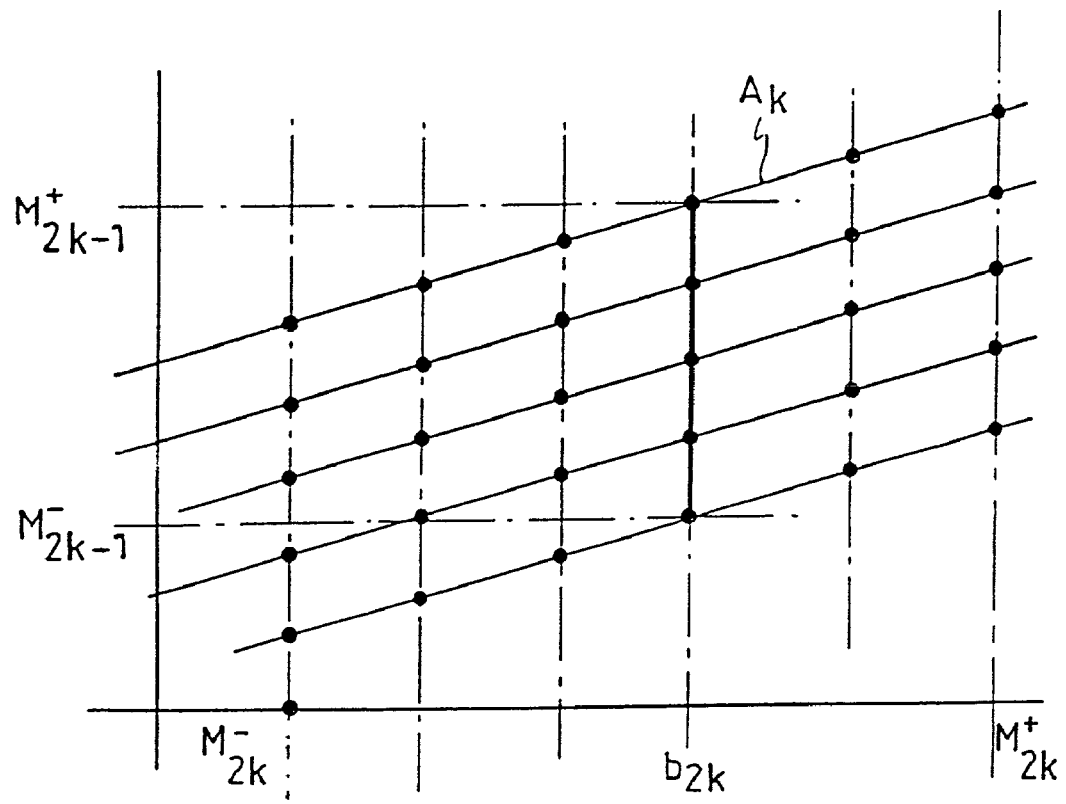
FIG. 4 depicts an example of a user modulation constellation.

The ranges of variation defined by (33) are advantageously restricted so as not to unnecessarily test points which are situated outside the constellation. It should be stated that each user k uses a constellation of symbols $A_k$, each symbol of the constellation being a complex number whose real and imaginary parts (possibly after affine transformation) are elements of Z. The general case is first of all taken where the lattice is of dimension 2K, where K is the number of users. For each user k, the dimensions 2k and 2k−1 bearing the complex symbol transmitted by or for the user k are considered. As indicated in FIG. 3, the constellation, or equivalently the modulation constellation of the user k, is first of all projected onto the dimension 2k. This projection defines an interval $[M_{2k}^-, M_{2k}^+]$. The search interval $[B_{2k}^-, B_{2k}^+]$ is then defined where:

$$B_{2k}^- = \text{Upp}(L_{2k}^-, M_{2k}^-) \text{ and } B_{2k}^+ = \text{Low}(L_{2k}^+, M_{2k}^+) \quad (34)$$

and an integer $b_{2k}$ is chosen in this interval. The component $b_{2k}$ then defines an interval $[M_{2k-1}^-, M_{2k-1}^+]$ for the component $b_{2k-1}$ as indicated in FIG. 3. A search interval $[B_{2k-1}^-, B_{2k-1}^+]$ is then defined by:

$$B_{2k-1}^- = \text{Upp}(L_{2k-1}^-, M_{2k-1}^-) \text{ and } B_{2k-1}^+ = \text{Low}(L_{2k-1}^+, M_{2k-1}^+) \quad (34')$$

By proceeding in this way it is ensured that the closest neighbour is sought only amongst candidates which are both situated in the search sphere and points in the constellation.

The situation is slightly different when real spreading sequences are used and therefore when the lattice is of dimension K (where K is the number of users). In this case, the real and imaginary values of the symbols are the subject of parallel searches in a lattice $(\Lambda, \Omega)$ of dimension K The calculation of the search bounds (and the choice of the values of the components) relates by turns to the real part and the imaginary part, in an interleaved fashion.

In the simple example where the modulation employed on a dimension i is a PAM modulation of order M, the integer coordinate $b_i$ of the point sought must be between 0 and M−1. The search bounds are adjusted by $B_i^- = \text{Upp}(L_i^-, 0)$ and $B_i^+ = \text{Low}(L_i^+, M-1)$ so that the counter associated with the component $b_i$ does not travel over points which are situated outside the search sphere or outside the constellation. This adjustment of the search bounds considerably accelerates the algorithm for detection by spheres.

In addition, the search within the sphere can be accelerated still further by updating the radius $\sqrt{C}$ with the last calculated Euclidian norm $\|w\|$.

The initial value of the search radius $\sqrt{C}$ must be chosen in an appropriate manner. This is because the number of points in the lattice situated within the decoding sphere increases with C. This is why the choice of a large value of C disadvantages the decoding algorithm whilst the search sphere may be empty if C is too low.

So as to be sure that the decoder finds at least one point in the lattice, a search radius greater than the radius of coverage of the lattice is advantageously chosen. It can for example be taken so as to be equal to the upper Rogers bound:

$$\sqrt{C}^\kappa = (\kappa \log \kappa + \kappa \log \log \kappa + 5\kappa) \times \frac{|\det(\mathbf{G})|}{V_\kappa} \quad (35)$$

where $V_\kappa$ is the volume of a sphere of unity radius in the real space $\mathbb{R}^\kappa$.

FIG. 3 depicts a flow diagram for the search for the closest neighbour used in the method of detection by spheres according to the invention.

The vector z, the matrix G and the initial value C are the parameters transmitted to the search method.

It will be assumed that the situation prevails where $\kappa = 2K$, the simplified case $\kappa = K$ being derived therefrom without difficulty.

In a first step 301, the Cholesky factorisation of the Gram matrix $\Gamma = GG^T$ is carried out if the vector z has not resulted from a whitening (otherwise the matrix G is, as has been seen, already triangular and inferior). The coefficients $q_{ij}$ are calculated according to equation (25) and the values $\rho_k$ are calculated by the equation: $\varrho = zG^{-1}$.

At step 302 the quadratic value of the smallest current distance is initialised to C: $D_{min}^2 = C$ and the recursive calculation of the search bounds is initialised by: $T_\kappa = C$, $S_i = \rho_i$, $i = 1, \ldots, \kappa$. The values of bounds $M_i^-$, $M_i^+$ are also determined with $i = 2k$, $k = 1, \ldots, K$ and next K tables are constructed giving the values $M_i^-$, $M_i^+$ with $i = 2k-1$, $k = 1, \ldots, K$ corresponding to the different possible values $b_{2k}$.

At step 303 the index of the search dimension is initialised, that is to say $i = \kappa$.

At step 304 the values $L_i^-$, $L_i^+$ are calculated by means of equation (33). $B_i^-$, $B_i^+$ are determined by means of equation (34) if i is even. If i is odd, $M_i^-$, $M_i^+$ are determined from the table $(i+1)/2$ and the value of $b_{i+1}$. The bounds $B_i^-$, $B_i^+$ are next determined according to equation (34'). In addition, $b_i$ is initialised to the value $B_i^- - 1$.

At step 305 the value of $b_i$ is incremented by 1: $b_i = b_i + 1$.

Step 306 consists of a test: $b_i > B_i^+$?

If the test at 306 is negative, step 307 is passed to and it is tested whether $i > 1$.

If the test at 307 is positive, the search bounds are calculated step by step. At step 310, $T_{i-1} = T_i - q_{ii}(S_i - b_i)^2$ and $\xi_i = \rho_i - b_i$ are calculated and then, at step 311, $$S_{i-1} = \rho_{i-1} + \sum_{j=i}^{\kappa} q_{j,i-1} \xi_j$$

is calculated. Next i is decremented at 312 before returning to step 304 in order to calculate the search bounds for $i-1$.

When the test at 307 is negative, step 308 is passed to in order to calculate the quadratic norm $\|w\|^2$ of the vector w relating to the current point by $\|w\|^2 = T_\kappa - T_1 + q_{11}(S_1 - b_1)^2$. Then it is tested whether $\|w\|^2 < D_{min}^2$. If such is not the case 305 is continued with. On the other hand, if the minimum distance is improved, step 313 is passed to, at which the components $b_i$ of the vector x corresponding to this minimum are stored. The minimum quadratic distance is updated by $D_{min}^2 = \|w\|^2$ and the size of the search sphere by $T_\kappa = \|w\|^2$. The search procedure is recommenced by returning to 303.

If the test at 306 is positive, that is to say if the upper search bound is reached for the current dimension, it is tested at 321 whether $i = \kappa$. If such is the case, the search is terminated at 320 and the last vector x stored is the closest neighbour. On the other hand, if the test is negative, the search continues by incrementing i at step 322 and returning to step 305.

The invention claimed is:

1. Method of detecting a plurality of symbols ($d_k(i)$) transmitted by or for a plurality K of users, each symbol belonging to a modulation constellation and being the subject of a spectral spreading by means of a spreading sequence, the method comprising a filtering step adapted for supplying a real vector (z) characteristic of a received signal, wherein at least the closest neighbour of the vector is sought within a lattice of points ($\Xi$) generated by said modulation constellations, the search being limited to candidate vectors (x), each of whose components ($b_i$) has a value lying within a search interval defined by a lower bound ($B_i^-$) and an upper bound ($B_i^+$), the bounds being chosen so that each of the intervals comprises only component values of points situated within a sphere with a predetermined radius ($\sqrt{C}$) and belonging to a modulation constellation.

2. Detection method according to claim 1, wherein, for a component with a given index i, each pair of bounds, lower ($B_i^-$) and upper ($B_i^+$), is calculated from a quantity $T_i$ characteristic of the width of the search interval for said component, this characteristic quantity being determined by recurrence on the index i, the characteristic quantity ($T_i$) for a given index being determined from the quantity with the previous index ($T_{i+1}$) and the value of a component ($b_{i+1}$) chosen in the search interval ([$B_{i+1}^-$, $B_{i+1}^+$]) relating to the component with the previous index.

3. Detection method according to claim 2, wherein, for a candidate vector component with a given index (2k), the lower bound of the search interval is chosen so as to be greater than the smallest integer ($M_{2k}^-$) corresponding to a symbol of the modulation constellation ($A_k$) and the upper bound of the search interval is chosen so as to be less than the largest integer ($M_{2k}^+$) corresponding to a symbol of the modulation constellation.

4. Detection method according to claim 2, wherein, for a first candidate vector component with a given index (2k−1), the lower bound of the search interval is chosen so as to be greater than a first integer ($M_{2k-1}^-$) and the upper bound of the search interval is chosen so as to be less than a second integer ($M_{2k-1}^+$), the first and second integers being determined from the value of a second component ($b_{2k}$) of the candidate vector such that the first and second components relate to one and the same user.

5. Detection method according to claim 4, wherein the first and second integers are respectively determined as the smallest value and the largest value of the first component such that the complex number defined by the value of the first component and the value of the second component is a symbol of the modulation constellation of the said user.

6. Detection method according to any of the preceding claims, wherein the search for the closest neighbour is effected by scanning one by one the search intervals for the different component indices (i) and choosing a component value ($b_i$) in each of the intervals, the bounds of each interval being determined according to the width of the interval with the preceding index (i+1) and the component value ($b_{i+1}$) chosen in this same interval.

7. Detection method according to any of claims 1–5, wherein, if, during the search, the norm ($\|w\|$) of a candidate vector is less than the radius of the sphere, the radius is updated to the value of said norm.

* * * * *